United States Patent
Arul

(10) Patent No.: US 10,661,695 B2
(45) Date of Patent: May 26, 2020

(54) DUMP BODY THAT INCLUDES A PIVOT ASSEMBLY WITH EXTERNALLY ACCESSIBLE GUSSETS

(71) Applicant: Caterpillar Inc., Deerfield, IL (US)

(72) Inventor: Samuel Judson William Arul, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 131 days.

(21) Appl. No.: 16/010,562

(22) Filed: Jun. 18, 2018

(65) Prior Publication Data
US 2019/0381925 A1    Dec. 19, 2019

(51) Int. Cl.
*B60P 1/28* (2006.01)

(52) U.S. Cl.
CPC .................. *B60P 1/286* (2013.01)

(58) Field of Classification Search
CPC .. B60P 1/28; B60P 1/283; B60P 1/286; B60P 1/16; B60P 1/04; B60P 1/26; B60P 3/423; B60P 1/02; B60P 1/045
USPC ...... 298/17 R, 22 R, 17.5, 2, 11, 17.8, 17 B, 298/22 P, 18, 24, 23 R, 23 M; 414/809, 414/498, 404, 420, 467, 474, 812, 680, 414/642, 563, 500
See application file for complete search history.

(56) References Cited

U.S. PATENT DOCUMENTS

| 2,910,322 | A | * | 10/1959 | Magor ................. B62D 33/023 |
| | | | | 296/183.1 |
| 5,033,794 | A | * | 7/1991 | Vick ........................ B60P 1/16 |
| | | | | 298/22 R |
| 5,555,699 | A | | 9/1996 | Fitzgerald |
| 9,751,445 | B1 | | 9/2017 | Arul et al. |
| 2003/0178883 | A1 | | 9/2003 | Hinds et al. |
| 2015/0165957 | A1 | * | 6/2015 | Sarangapani ........... B60P 1/286 |
| | | | | 296/183.2 |
| 2016/0355117 | A1 | * | 12/2016 | Wang ....................... B60P 1/04 |
| 2017/0066359 | A1 | | 3/2017 | Rissman et al. |

* cited by examiner

*Primary Examiner* — D Glenn Dayoan
*Assistant Examiner* — Sunsurraye Westbrook
(74) *Attorney, Agent, or Firm* — Harrity & Harrity LLP

(57) ABSTRACT

A pivot assembly is disclosed. The pivot assembly may include plates. The plates may be connected to cover plates associated with respective portions of a stringer that intersect the pivot assembly. The plates may be connected to a rib that interests the pivot assembly perpendicular to the respective portions of the stringer. The cover plates may be connected to the rib at a respective end of the cover plates. The pivot assembly may comprise a respective pivot bore in the plates. The pivot assembly may comprise respective doublers around the respective pivot bore. The respective doublers may include a first doubler located on an outside surface of a plate, of the plates, and a second doubler located on an inside surface of the plate. The pivot assembly may comprise gussets. The gussets may be connected to the second doubler, the plates, and a respective cover plate of the cover plates.

20 Claims, 6 Drawing Sheets

DUMP BODY THAT INCLUDES A PIVOT ASSEMBLY WITH EXTERNALLY ACCESSIBLE GUSSETS

TECHNICAL FIELD

The present disclosure relates generally to a dump body and, more particularly, to a dump body that includes a pivot assembly with externally accessible gussets.

BACKGROUND

A machine, such as a large off-highway truck used in the mining and/or heavy construction industries, may include a dump body that is used to move material (e.g., ore, minerals, overburden, rocks, dirt, and/or the like) from one point to another. Due to the size, use, and/or cost of these types of machines, durability of the machine, and of the dump body in particular, may be a consideration during design of the machine. In some cases, an increased overall weight of the resulting machine may be a result of attempting to increase a durability of the machine (e.g., via use of thick metal plates for components of the machine, via use of additional material for structural support of the machine, and/or the like) but may negatively impact a maximum payload weight that the machine can receive (e.g., the more the machine weighs, the less payload the machine may be capable of receiving due to total weight limitations of tires, brakes, and/or the like of the machine).

In addition, some components of the machine may be partially, or entirely, enclosed within other components (e.g., within an assembly) based on use and/or function of the components, and/or the like. For example, some gussets of a pivot assembly, such as those used to provide rigidity to control deformation and/or buckling caused by large payloads and/or that control distractions that occur during welding of long structural members, may be internal to the pivot assembly (e.g., based on the location in which the gussets are used and/or needed being inside an enclosed section of a long continuous structure). This may increase a difficulty of inspecting the components, repairing the components, replacing the components, and/or the like, thereby increasing an amount of time and/or a cost of these activities, thereby causing a design of these components to include more weight to increase a durability of the components due to the difficulty of these activities, and/or the like.

One attempt to adapt a dump body is disclosed in U.S. Patent Application Publication No. 2003/0178883 published on Sep. 25, 2003 ("the '883 publication"). In particular, the '883 publication discloses a body support assembly for an off-highway truck. In particular, the '883 publication discloses a body support assembly for pivotally attaching the dump body to the frame of the truck. The body support assembly includes a base member and a first and second body support member attached to the base member. The first and second body support members each includes a bore adapted to receive a steel pin. The '883 publication provides a dump body that can be manufactured without the need to line bore the pin bores after welding of the dump body has been completed.

While the '883 publication may provide a dump body that can be manufactured without the need to line bore the pin bores after welding of the dump body has been completed, other designs of a dump body may facilitate other functions and/or uses.

The dump body of the present disclosure provides one or more other functions and/or uses that are different than what is set forth above in the art.

SUMMARY

According to some aspects, the present disclosure is related to a pivot assembly, comprising a plurality of plates. The plurality of plates may be connected to a plurality of cover plates associated with a plurality of respective portions of a stringer that intersects the pivot assembly. The plurality of plates may be further connected to a rib that intersects the pivot assembly perpendicular to the plurality of respective portions of the stringer. The plurality of cover plates may be connected to the rib at a respective end of the plurality of cover plates. The pivot assembly may further comprise a respective pivot bore in the plurality of plates. The pivot assembly may further comprise a respective plurality of doublers around the respective pivot bore. The respective plurality of doublers may include a first doubler located on an outside surface of a plate, of the plurality of plates, and a second doubler located on an inside surface of the plate. The pivot assembly may further comprise a plurality of gussets. The plurality of gussets may be connected to the second doubler, the plurality of plates, and a respective cover plate of the plurality of cover plates.

According to some aspects, the present disclosure is related to a dump body, comprising a pivot assembly. The pivot assembly may comprise a plate connected to a plurality of cover plates associated with a plurality of respective portions of a stringer that intersects the pivot assembly. The plurality of cover plates may be connected to a rib of the dump body at a respective end of the plurality of cover plates. The pivot assembly may further comprise a respective pivot bore in the plate. The pivot assembly may further comprise a respective plurality of doublers around the respective pivot bore. The pivot assembly may further comprise a plurality of gussets. Each gusset, of the plurality of gussets, may be connected to the plate, a respective cover plate, of the plurality of cover plates, and a doubler of the respective plurality of doublers. The dump body may further comprise the rib that intersects the pivot assembly perpendicular to the stringer. The dump body may further comprise the stringer that intersects the pivot assembly perpendicular to the rib. The plurality of respective portions of the stringer may include discontinuous structures.

According to some aspects, the present disclosure is related to a machine, comprising a pivot assembly associated with a dump body of the machine. The dump body may comprise a plurality of plates. The plurality of plates may be connected to a plurality of cover plates associated with a plurality of respective portions of a stringer that intersects the pivot assembly. The plurality of plates may be further connected to a rib that intersects the pivot assembly perpendicular to the stringer. The plurality of cover plates may be connected to the rib at a respective end of the plurality of cover plates. The pivot assembly may further comprise a respective pivot bore in the plurality of plates. The pivot assembly may further comprise a respective plurality of doublers around the respective pivot bore. The respective plurality of doublers may include a first doubler located on an outside surface of a plate, of the plurality of plates, and a second doubler located on an inside surface of the plate. The first doubler and the second doubler may substantially overlap with each other on respective surfaces of the plate. The pivot assembly may further comprise a plurality of gussets between the plurality of plates. The plurality of gussets may be connected to an exterior surface of a respective cover plate of the plurality of cover plates.

DETAILED DESCRIPTION

Figure 1:
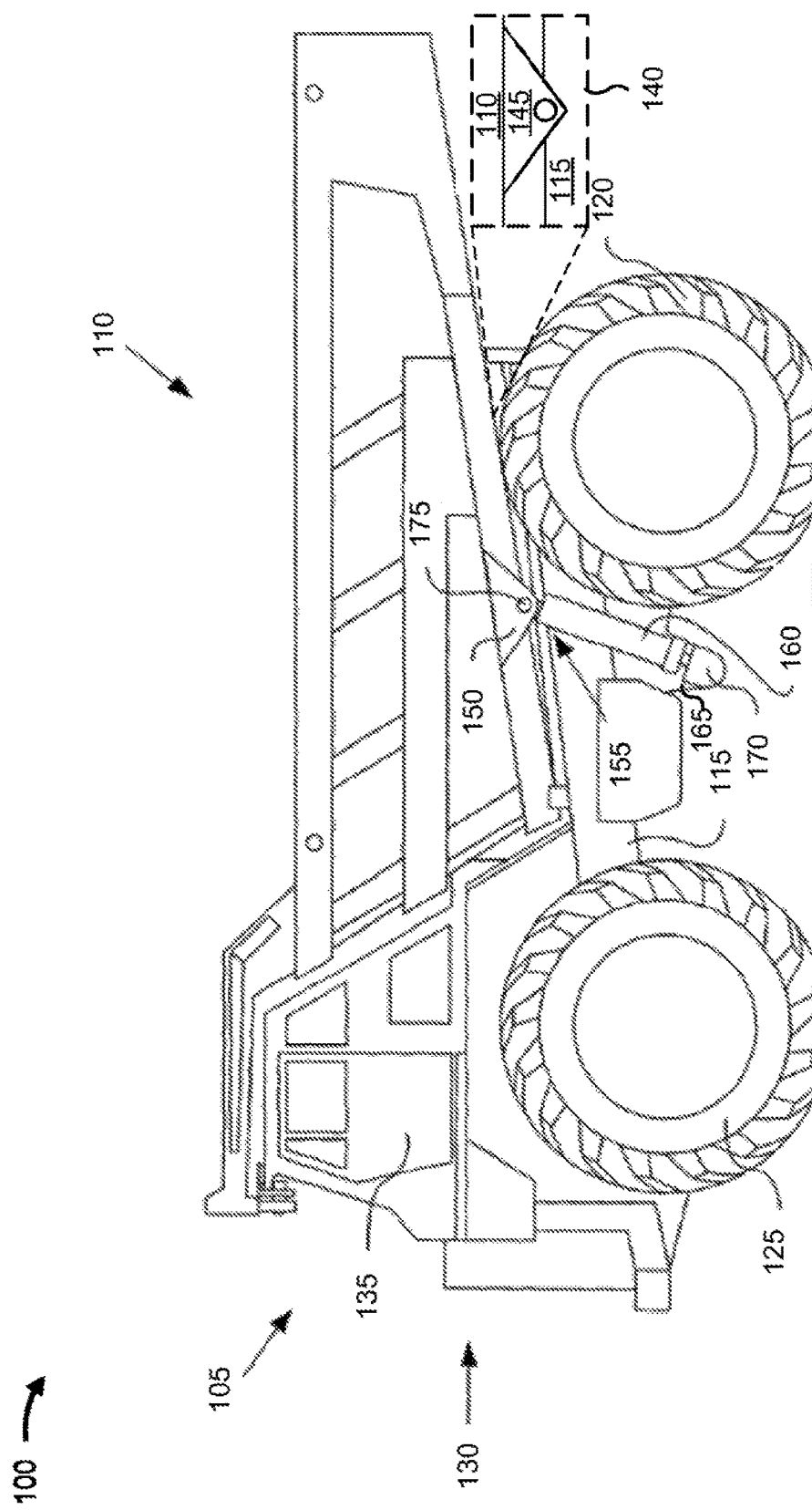
FIG. 1 is a diagram of a side view of an example machine that includes a dump body that includes a pivot assembly with externally accessible gussets.

FIG. 1 is a diagram 100 of a side view of an example machine that includes a dump body that includes a pivot assembly with externally accessible gussets. FIG. 1 shows an off-highway truck 105 having a dump body 110. The off-highway truck 105 may include a frame 115 having a plurality of rear wheels 120 and a pair of front wheels 125. An engine compartment 130 and an operator's cab 135 may be mounted at one end of the frame 115. An engine (not shown in FIG. 1) and a transmission (not shown in FIG. 1) may be mounted within the engine compartment 130.

The dump body 110 may include a box portion and a skeletal structure. The dump body 110 may comprise steel, aluminum, and/or the like. The box portion may define an inside surface and an outside surface (e.g., of a bed plate, or multiple bed plates, that form a base or a floor of the box portion). The box portion may include two side walls (e.g., a first side wall and a second side wall), and a front wall positioned between the first side wall and the second side wall toward the end of the machine that includes the engine compartment 130 and/or the operator's cab 135. The dump body 110 may include a tailgate to prevent payload from spilling from dump body 110 during transport. The tailgate may be configured to move between an open position and a closed position. The tailgate may be positioned in the box portion toward another end of the off-highway truck 105 away from the end that includes the engine compartment 130 and/or the operator's cab 135.

The skeletal structure may include a pair of stringers that extend along the outside surface of a bed plate of the dump body 110 between a first end of the dump body 110 that includes the front wall and a second end of the dump body 110 that includes the tailgate, a plurality of ribs that extend along the outside surface of the bed plate of the dump body 110 between a first side of the bed plate of the dump body 110 that includes the first side wall and a second side of the bed plate of the dump body 110 that includes the second side wall.

As shown by reference number 140, the dump body 110 may be pivotally attached to frame 115 by a pivot assembly 145 (e.g., the same as or similar to a pivot assembly 208 described elsewhere herein). The pivot assembly 145 may be located on the outside surface of the dump body 110 (e.g., on the outside surface of the bed plate of the dump body 110), toward the rear of the dump body 110. The dump body 110 may further include a pair of cylinder brackets 150. The pair of cylinder brackets 150 may be connected to the outside surface of the bed plate of the dump body 110. The pair of cylinder brackets 150 may be positioned toward the front of the dump body 110. A cylinder bracket 150 may be configured to receive a first end 155 of a hydraulic cylinder 160.

As further shown in FIG. 1, a second pair of cylinder brackets 165 may be connected to a second end 170 of the hydraulic cylinder 160. The first end 155 and the second end 170 may be connected to pivot bores of respective cylinder brackets (e.g., cylinder bracket 150 may be connected to the first end 155 via a pivot bore 175). The hydraulic cylinders 160 may be moveable between a retracted position (shown) and an extended position (not shown). In the extended position, the front end of dump body 110 may be raised for ejecting payload from the box portion of the dump body 110. The retracted position may be utilized for loading payload into the box portion of the dump body 110.

As indicated above, FIG. 1 is provided as an example. Other examples are possible and may differ from what was described in connection with FIG. 1. In some implementations, off-highway truck 105 may include additional components, fewer components, different components, or differently arranged components than those shown in FIG. 1.

Figure 2:
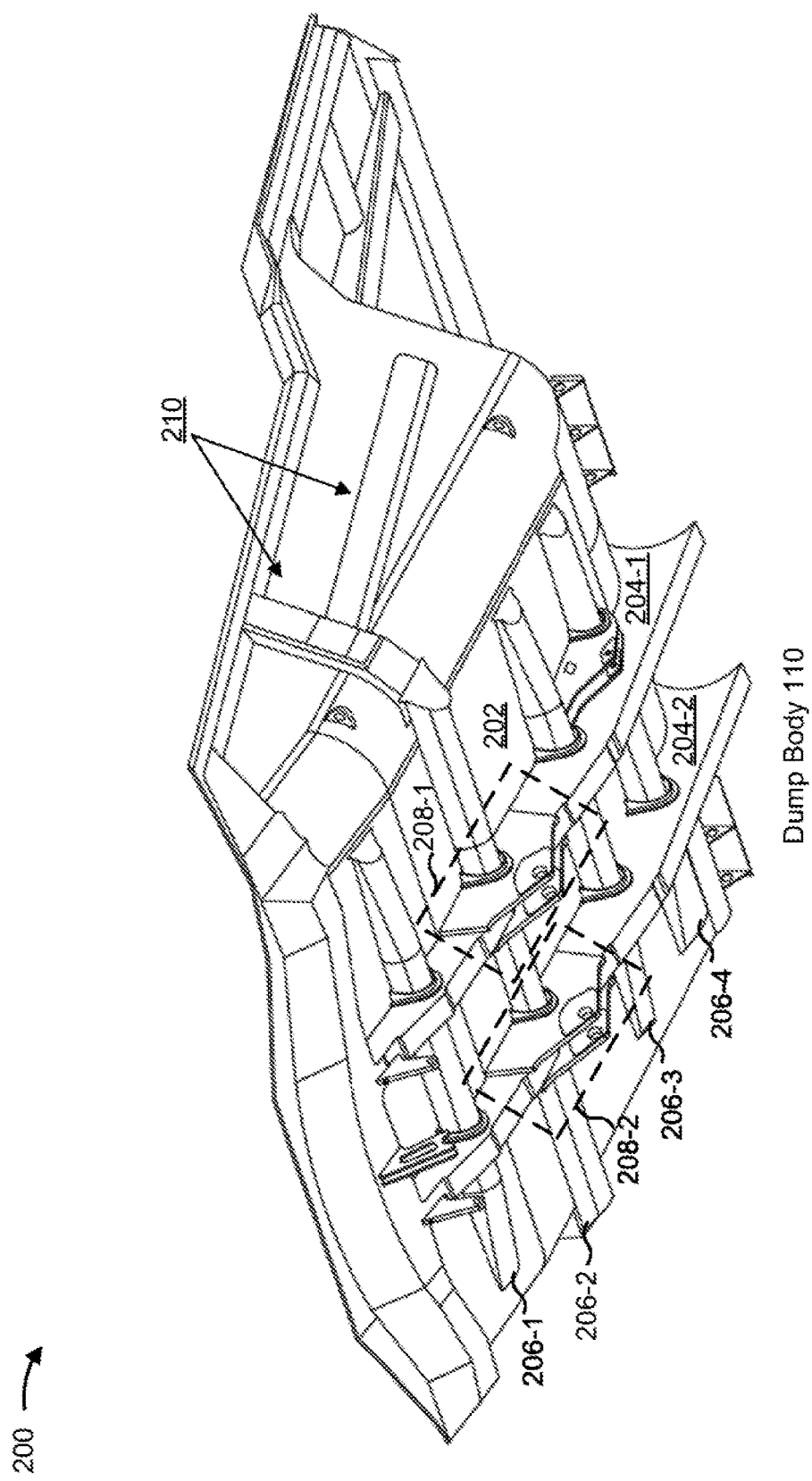
FIG. 2 is a diagram of a perspective view of an example dump body of the example machine of FIG. 1.

FIG. 2 is a diagram 200 of a perspective view of an example dump body of the example machine of FIG. 1. For example, FIG. 2 shows a perspective view of a bottom of the dump body 110 (e.g., a bottom of a box portion of the dump body 110, an outside surface of a bed plate of the dump body 110, and/or the like).

As shown in FIG. 2, the dump body 110 may include a bed plate 202. The bed plate 202 may form an outside surface of the dump body 110 (e.g., an outside surface of a box portion of the dump body 110). In some implementations, the bed plate 202 may form an inside surface, or a floor, of the dump body 110 (e.g., of a box portion of the dump body 110). In some implementations, one or more other plates, similar to bed plate 202, may be connected to bed plate 202 to form the inside surface of the dump body 110.

As further shown in FIG. 2, the dump body 110 may include a set of stringers 204 (e.g., stringers 204-1 and 204-2). In some implementations, the set of stringers 204 may be connected to the bed plate 202. For example, the set of stringers 204 may be connected to the bed plate 202 via welding, via use of a fastener (e.g., a bolt, a rivet, a screw, and/or the like), and/or the like. In some implementations, the set of stringers 204 may be fabricated from metal, such as steel, aluminum, and/or the like. In some implementations, the set of stringers 204 may extend from a first end of the dump body 110 that includes a front wall to a second end of the dump body 110 that includes a tailgate. For example, the set of stringers 204 may extend in a direction parallel to a general direction of travel of the off-highway truck 105. The set of stringers 204 may include various components, as described elsewhere herein.

As further shown in FIG. 2, the dump body 110 may include a set of ribs 206 (e.g., ribs 206-1 through 206-4). In some implementations, the set of ribs 206 may be connected to bed plate 202. For example, the set of ribs 206 may be connected to bed plate 202 via welding, via use of a fastener, and/or the like. In some implementations, the set of ribs 206 may be fabricated from metal, such as steel, aluminum, and/or the like. In some implementations, the set of ribs 206 may extend between sides of bed plate 202. For example, the set of ribs 206 may extend perpendicular to a general direction of travel of off-highway truck 105.

In some implementations, the dump body 110 may include stringers 204 along a width of the bed plate 202 (e.g., equally spaced along the width of the bed plate 202). Additionally, or alternatively, the dump body 110 may include ribs 206 along a length of the bed plate 202 (e.g., equally spaced along the length of the bed plate 202). In some implementations, the stringers 204 and the ribs 206 may intersect each other (e.g., in a perpendicular manner).

As further shown in FIG. 2, the dump body 110 may include a set of pivot assemblies 208 (e.g., pivot assemblies 208-1 and 208-2). The set of pivot assemblies 208 may facilitate rotation of the dump body 110 into various positions by movement of a set of hydraulic cylinders 160 (not shown) associated with the off-highway truck 105, such as for loading or unloading of payload. As further shown in FIG. 2, the stringers 204-1 and 204-2 may include a respective pivot assembly 208 (e.g., the stringer 204-1 may include the pivot assembly 208-1 and the stringer 204-2 may include the pivot assembly 208-2). For example, plates of the pivot assemblies 208-1 and 208-2 (described elsewhere herein) may be parallel with the stringers 204-1 and 204-2, respectively. In some implementations, and as shown in FIG. 2, a rib 206 of the dump body 110 may intersect the set of pivot assemblies 208 (e.g., may intersect the plates of the set of pivot assemblies 208). For example, the rib 206-2 may intersect the plates of the set of pivot assemblies 208 in a perpendicular manner. In some implementations, and as described in more detail elsewhere herein, the rib 206-2 may be a continuous structure around which the set of pivot assemblies 208 is formed.

As shown by reference number 210, the rib 206-2 may extend on a side wall of the dump body 110. For example, the rib 206-2 may extend toward a top of the side wall and/or toward a front of the side wall. This may provide mechanical support for the side wall and/or facilitate a transfer of load stress from the side wall into the pivot assemblies 208. In some implementations, a portion of the rib 206-2 that extends on a side wall of the dump body 110 may be formed as a single structure with the rib 206-2, may be formed as one or more separate structures that are connected to each other in association with installation of the rib 206-2 on the dump body 110, and/or the like. In some implementations, both the first side wall and the second side wall of the dump body 110 (described elsewhere herein) may be configured in this manner.

As indicated above, FIG. 2 is provided as an example. Other examples are possible and may differ from what was described in connection with FIG. 2. In some implementations, dump body 110 may include additional components, fewer components, different components, or differently arranged components than those shown in FIG. 2.

Figure 3:
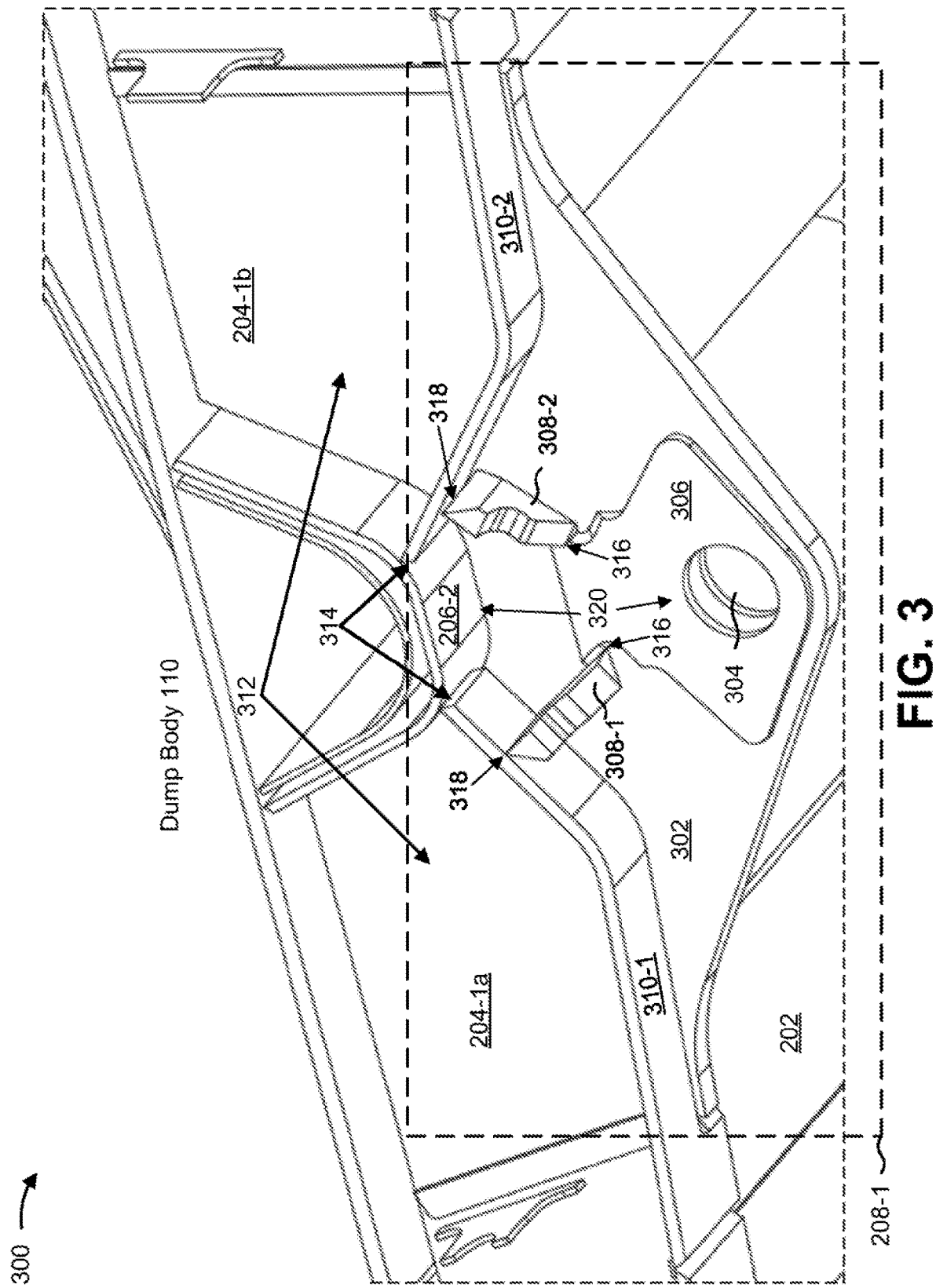
FIG. 3 is a diagram of a perspective cross-sectional view of an example pivot assembly as installed on a dump body of the example machine of FIG. 1.

FIG. 3 is a diagram 300 of a perspective cross-sectional view of an example pivot assembly as installed on a dump body of the example machine of FIG. 1. For example, FIG. 3 shows a perspective cross-sectional view of the pivot assembly 208-1 as installed on the dump body 110 of the off-highway truck 105. Although described in the context of the pivot assembly 208-1, the implementations apply equally to the pivot assembly 208-2.

As shown in FIG. 3, the pivot assembly 208-1 may include a plate 302. For example, the pivot assembly 208-1 may include a metal plate as the plate 302. In some implementations, the pivot assembly 208-1 may include another plate 302 (not shown) similar to that shown in FIG. 3. In some implementations, the plate 302 may be connected to portions of the stringer 204-1 (e.g., welded to the stringer 204-1). Additionally, or alternatively, the plate 302 may be connected to the rib 206-2 (e.g., welded to the rib 206-2), as described elsewhere herein. Additionally, or alternatively, the plate 302, in combination with the other plate 302 (not shown), may generally form a body of the pivot assembly 208-1 to which other components of the pivot assembly 208-1 may be connected.

As further shown in FIG. 3, the pivot assembly 208-1 may include a pivot bore 304 (e.g., may include a respective pivot bore 304 in a plurality of plates 302 of the pivot assembly 208-1). For example, the plate 302 may be formed such that the plate 302 defines a pivot bore 304. In some implementations, the pivot bore 304 may be configured to receive a pin and/or an associated bushing about which the dump body 110 may be rotated into various positions. In some implementations, because FIG. 3 shows a cross-sectional view of the pivot assembly 208-1, the pivot assembly 208-1 may include another pivot bore 304 in another plate 302 of the pivot assembly 208-1.

As further shown in FIG. 3, the pivot assembly 208-1 may include a doubler 306 on an inside surface of the plate 302. In some implementations, the pivot assembly 208-1 may include another doubler 306 on an outside surface of the plate 302, as described elsewhere herein. For example, the doubler 306 may be connected to plate 302 around pivot bore 304. In some implementations, the doubler 306 may be produced from metal. In some implementations, the doubler 306 may provide reinforcement to the pivot bore 304, may include bearings to facilitate rotation of the dump body 110, may protect the pivot bore 304 from damage during use, and/or the like.

As further shown in FIG. 3, the pivot assembly 208-1 may include a set of gussets 308 (e.g., shown as gussets 308-1 and 308-2). For example, the set of gussets 308 may be connected (e.g., welded, connected using a fastener, and/or the like) to the plate 302 of the pivot assembly 208-1. In some implementations, the set of gussets 308 may be connected to an inside surface of the plate 302. For example, the set of gussets 308 may be connected to plate 302 and to another plate 302 (not shown) (e.g., between the plate 302 and the other plate 302). In some implementations, despite being connected to an inside surface of the plate 302, the set of gussets 308 may be externally accessible from outside of the pivot assembly 208-1 (e.g., via spacing between the plate 302 and another plate 302 not shown in FIG. 3), as described elsewhere herein.

In some implementations, the set of gussets 308 may provide mechanical support for the pivot assembly 208-1, may transfer load stresses from the rib 206-2 to the pivot bore 304 and/or to the doubler 306, and/or the like. Additionally, or alternatively, the set of gussets 308 may provide needed rigidity to the dump body 110 to reduce mechanical stress to prevent damage to the dump body 110 during movement of payload (e.g., damage that could occur due to stresses experienced while traveling on bumpy or uneven roads, damage that could occur from shifting of payload and/or other stresses experienced during turning of the off-highway truck 105, and/or the like). For example, the set of gussets 308 may provide and/or control rigidity of the dump body 110. In some implementations, the configuration of the set of cover plates 310 (described below) may provide flexibility to absorb mechanical stress during use of dump body 110. For example, the spacing between plates 302 of pivot assembly 208-1 provides flexibility to absorb and/or dissipate mechanical stresses.

As further shown in FIG. 3, the stringer 204-1 and/or the pivot assembly 208-1 may include a set of cover plates 310 (e.g., cover plates 310-1 and 310-2). For example, a set of portions of the stringer 204-1, shown as portions 204-1a and 204-1b, associated with the dump body 110 may include a respective cover plate 310, the pivot assembly 208-1 may include respective cover plates 310 for portions of the stringer 204-1, and/or the like. In some implementations, the set of cover plates 310 may be formed from metal. In some implementations, the set of cover plates 310 may enclose an interior of the portions of the stringer 204-1, such as when the portions of the stringer 204-1 are formed in a generally "U" shape, in a generally "V" shape, and/or the like. In this way, the set of cover plates 310 may protect the interior of the portions of the stringer 204-1 from debris and/or other material. In some implementations, the set of cover plates 310 may provide mechanical support to the portions of the stringer 204-1, such as to reduce or eliminate deformation of the portions of the stringer 204-1, to transfer load from the portions of the stringer 204-1 to the set of gussets 308, and/or the like.

As shown by reference number 312, the portions of the stringer 204-1 (e.g., portions 204-1a and 204-1b) may be discontinuous structures connected to the rib 206-2. For example, the portions of the stringer 204-1 may not be connected to each other, but rather may be separately connected to the rib 206-1 (e.g., via welding, via use of a fastener, and/or the like). This may reduce a weight of the stringer 204-1 and/or may facilitate a particular configuration of the rib 206-2 relative to the pivot bore 304, as described elsewhere herein.

As shown by reference number 314, the cover plates 310-1 and 310-2 may be discontinuous structures and respective ends of the cover plates 310-1 and 310-2 may be connected to the rib 206-2 (e.g., connected directly to the rib 206-2 or connected to the rib 206-2 via a saddle shaped plate, a floating bolster, a gusset, and/or the like). As further shown in FIG. 3, the respective ends of the cover plates 310-1 and 310-2 may be angled toward the rib 206-2 to connect the respective ends to the rib 206-2. This configuration of cover plates 310-1 and 310-2 and the rib 206-2 may facilitate a transfer of load stresses caused by a payload in the box portion of the dump body 110 into the stringer 204-1 and/or into the pivot assembly 208-1.

As shown by reference numbers 316, the set of gussets 308 may be connected to the doubler 306 when installed in the pivot assembly 208-1. This may facilitate a transfer of load stresses caused by a payload in the box portion of the dump body 110 from the cover plates 310-1 and 310-2 into the doubler 306, into a pin installed in pivot bore 304, and/or the like. In addition, and as further shown by reference number 316, the set of gussets 308 may be oriented such that the set of gussets is angled toward a center of the pivot bore 304. This further facilitates a transfer of load stresses caused by a payload in the box portion of the dump body 110. As shown by reference numbers 318, the set of gussets 308 may be connected to respective exterior surfaces of the cover plates 310 (e.g., respective surfaces of the cover plates 310 that are accessible via spacing between the plate 302 and another plate 302 (not shown) of the pivot assembly 208-1, respective surfaces of the cover plates 310 that are not enclosed within the pivot assembly 208-1 and/or the stringer 204-1 when the dump body 110 is assembled, and/or the like).

As shown by reference number 320, the rib 206-2 may be positioned relative to the pivot bore 304 when installed on the dump body 110 such that the rib 206-2 is aligned with the pivot bore 304 (e.g., the pivot bore 304 and the rib 206-2 may be in line with each other, may be substantially centered with respect to each other, and/or the like). In some implementations, and as further shown by reference number 320, a single rib 206 (e.g., the rib 206-2) may be used in association with the pivot assembly 208-1 (e.g., a single rib 206 may intersect the pivot assembly 208-1).

As indicated above, FIG. 3 is provided as an example. Other examples are possible and may differ from what was described in connection with FIG. 3. In some implementations, pivot assembly 208 may include additional components, fewer components, different components, or differently arranged components than those shown in FIG. 3.

Figure 4:
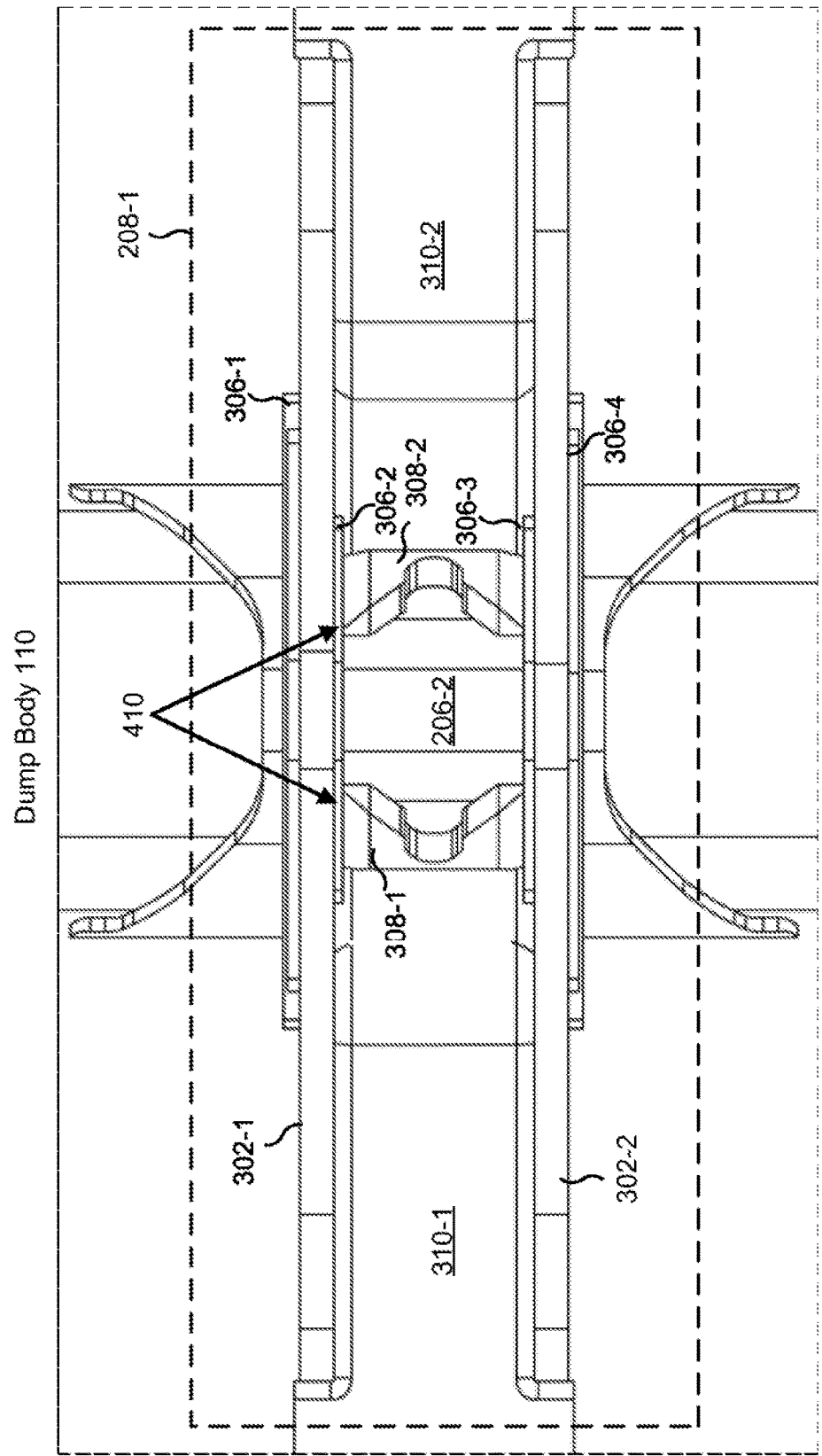
FIG. 4 is a diagram of a top view of an example pivot assembly installed on a dump body of the example machine of FIG. 1.

FIG. 4 is a diagram 400 of a top view of an example pivot assembly installed on a dump body of the example machine of FIG. 1. For example, FIG. 4 shows a top view of the bottom of the dump body 110 that includes the pivot assembly 208-1. Although described in the context of the pivot assembly 208-1, the implementations apply equally to the pivot assembly 208-2.

As shown in FIG. 4, and similar to that described with regard to FIG. 3, the pivot assembly 208-1 may include multiple plates 302 (e.g., plates 302-1 and 302-2). As further shown in FIG. 4, the pivot assembly 208-1 may include doublers 306 on both an inside surface and an outside surface of the plates 302. For example, the plate 302-1 may include a doubler 306-1 on an outside surface of the plate 302-1 and a doubler 306-2 on an inside surface of the plate 302-1. Additionally, or alternatively, and as another example, the plate 302-2 may include a doubler 306-3 on an inside surface of the plate 302-2 and a doubler 306-4 on an outside surface of the plate 302-2.

As shown by reference number 410, the doublers 306 of the pivot assembly 208-1 may be externally accessible via a spacing between the plate 302-1 and the plate 302-2, based on being connected to an exterior surface of the cover plates 310, based on the configuration of the cover plates 310 (e.g., based on the cover plates 310 being separate discontinuous structures that are connected to the rib 206-2 in the manner described elsewhere herein), and/or the like.

As indicated above, FIG. 4 is provided as an example. Other examples are possible and may differ from what was described in connection with FIG. 4. In some implementations, the dump body 110 may include additional components, fewer components, different components, or differently arranged components than those shown in FIG. 4.

Figure 5:
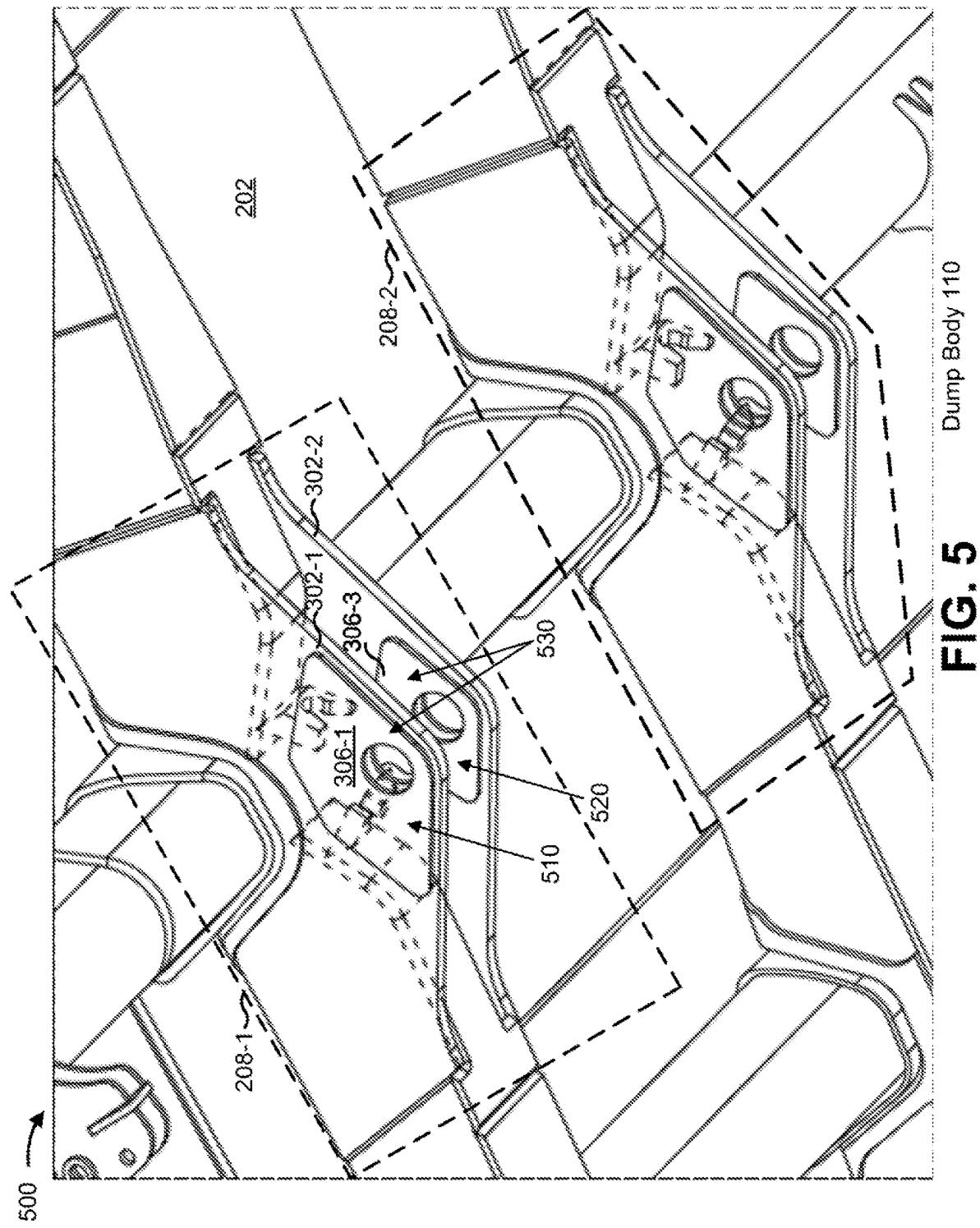
FIG. 5 is a diagram of a perspective view of multiple example pivot assemblies installed on a dump body of the example machine of FIG. 1.

FIG. 5 is a diagram 500 of a top view of multiple example pivot assemblies installed on a dump body of the example machine of FIG. 1. For example, FIG. 5 shows a bottom of a box portion of the dump body 110 (e.g., an outside surface of a bed plate 202 of the dump body 110).

Reference number 510 shows doubler 306-1 on the outside surface of the plate 302-1 of the pivot assembly 208-1. Reference number 520 shows doubler 306-3 on the inside surface of the plate 302-2 of the pivot assembly 208-1. As shown by reference number 530, and as described elsewhere herein, the doubler 306-1 and the doubler 306-3 may be substantially aligned with each other. In some implementations, other doublers 306 of the pivot assembly 208-1 (e.g., the doublers 306-2 and 306-4 (not shown in FIG. 5)) may be substantially aligned with the doublers 306-1 and 306-3. In some implementations, the pivot assembly 208-2 may be configured in a manner that is the same as or similar to that described with regard to the pivot assembly 208-1.

As indicated above, FIG. 5 is provided as an example. Other examples are possible and may differ from what was described in connection with FIG. 5. In some implementations, the dump body 110 may include additional components, fewer components, different components, or differently arranged components than those shown in FIG. 5.

Figure 6:
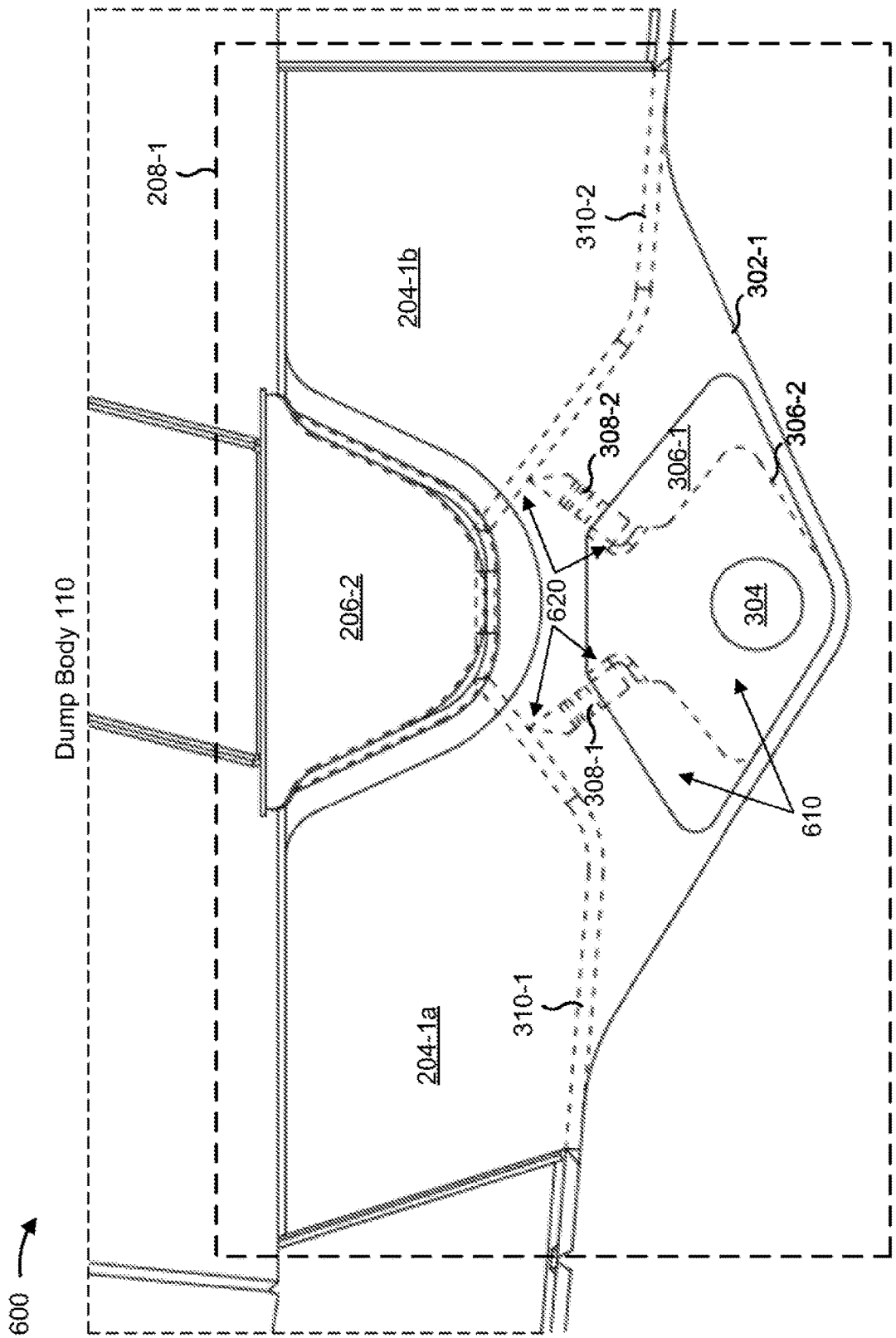
FIG. 6 is a diagram of a cross-sectional view of an example pivot assembly as installed on a dump body of the example machine of FIG. 1.

FIG. 6 is a diagram 600 of a cross-sectional view of an example pivot assembly as installed on a dump body of the example machine of FIG. 1. For example, FIG. 6 shows a cross-sectional view of the pivot assembly 208-1. Although FIG. 6 is described in the context of the pivot assembly 208-1, the implementations apply equally to the pivot assembly 208-2.

As shown by reference number 610, the doubler 306-1 (shown with solid lines) and the doubler 306-2 (shown with dashed lines) may substantially overlap on respective sides of the plate 302-1. For example, the doubler 306-1 and the doubler 306-2 may substantially overlap based on a position of the doubler 306-1 on the outside surface of the plate 302-1 and a position of the doubler 306-2 on the inside surface of the plate 302-1. Although not shown in FIG. 6, the doubler 306-3 and the doubler 306-4 may be configured on the plate 302-2 in a similar manner. Reference number 620 shows the manner in which the set of gussets 308 (shown with dashed lines) is connected to respective cover plates 310 (shown with dashed lines) and to the doubler 306-2). For example, a gusset 308-1 may be connected to a respective cover plate 310 at one end of the gusset 308-1 and to the doubler 306-2 at another end of the gusset 308-1.

As indicated above, FIG. 6 is provided as an example. Other examples are possible and may differ from what was described with regard to FIG. 6. In some implementations, the pivot assembly 208 may include additional components, fewer components, different components, or differently arranged components than those shown in FIG. 6.

INDUSTRIAL APPLICABILITY

The disclosed dump body 110 may be used with any machine that includes a dump body, such as an off-highway truck 105. By including a single rib 206 in association with a set of pivot assemblies 208 associated with the dump body 110 (e.g., a single rib 206 that intersects the set of pivot assemblies 208 and is aligned with a set of pivot bores 304 of the set of pivot assemblies 208), an unloaded weight of the dump body 110 may be reduced without negatively impacting a structural integrity of the dump body 110. For example, the dump body 110 may not include material that would otherwise be included if multiple ribs 206 intersected the set of pivot assemblies 208. This increases a weight of a payload that the off-highway truck 105 can receive based on the off-highway truck 105 having a lower unloaded weight.

In addition, by including a set of gussets 308 that are externally accessible, an efficiency of inspecting, repairing, and/or replacing the set of gussets 308 may be increased and/or a downtime of the off-highway truck 105 may be reduced. For example, less time may be needed to perform these activities due to the ease of access that the configuration of the components of the pivot assembly 208 described herein provides. Further, by being easily accessible for repair and/or replacement, the set of gussets 308 can be designed with less material, which may reduce an unloaded weight of the off-highway truck 105 and/or may reduce a cost of producing the off-highway truck 105.

Further, by including a set of gussets 308 that is connected to respective cover plates 310 and to a doubler 306 in the manner described herein, a structural integrity of the dump body 110 may be maintained despite the stringers 204 of the dump body 110 being formed in multiple portions, despite the dump body 110 including fewer ribs 206 based on the configuration of the ribs 206 relative to pivot bores 304 of pivot assemblies 208 of the dump body, and/or the like. Further, by including doublers 306 that substantially overlap, the structural integrity of the dump body 110 may be maintained despite various components of the dump body 110, various components of a pivot assembly 208, and/or the like being configured in the manner described herein.

What is claimed is:

1. A pivot assembly, comprising:
   a plurality of plates,
      wherein the plurality of plates is connected to a plurality of cover plates associated with a plurality of respective portions of a stringer that intersects the pivot assembly,
      wherein the plurality of plates is further connected to a rib that intersects the pivot assembly perpendicular to the plurality of respective portions of the stringer,
         wherein the plurality of cover plates is connected to the rib at a respective end of the plurality of cover plates;
   a respective pivot bore in the plurality of plates;
   a respective plurality of doublers around the respective pivot bore,
      wherein the respective plurality of doublers includes a first doubler located on an outside surface of a plate, of the plurality of plates, and a second doubler located on an inside surface of the plate; and
   a plurality of gussets,
      wherein the plurality of gussets is connected to the second doubler, the plurality of plates, and a respective cover plate of the plurality of cover plates.

2. The pivot assembly of claim 1, wherein the respective pivot bore and the rib are in line with each other.

3. The pivot assembly of claim 1, wherein the first doubler and the second doubler substantially overlap on respective sides of the plate.

4. The pivot assembly of claim 1, wherein the pivot assembly is included in a dump body associated with a machine.

5. The pivot assembly of claim 4, wherein the rib is a continuous structure that is connected to the pivot assembly and to another pivot assembly of the dump body.

6. The pivot assembly of claim 1, the plurality of cover plates includes a plurality of discontinuous structures.

7. The pivot assembly of claim 1, wherein the plurality of respective portions of the stringer includes a first respective portion of the stringer and a second respective portion of the stringer that are connected to the rib and that are discontinuous from each other.

8. A dump body, comprising:
   a pivot assembly, comprising:
      a plate connected to a plurality of cover plates associated with a plurality of respective portions of a stringer that intersects the pivot assembly,
         wherein the plurality of cover plates is connected to a rib of the dump body at a respective end of the plurality of cover plates;
      a respective pivot bore in the plate;
      a respective plurality of doublers around the respective pivot bore; and
      a plurality of gussets,
         wherein each gusset, of the plurality of gussets, is connected to the plate, a respective cover plate, of the plurality of cover plates, and a doubler of the respective plurality of doublers;

the rib that intersects the pivot assembly perpendicular to the stringer; and the stringer that intersects the pivot assembly perpendicular to the rib, wherein the plurality of respective portions of the stringer includes discontinuous structures.

9. The dump body of claim 8, wherein the respective plurality of doublers includes a first doubler located on an outside surface of the plate and a second doubler located on an inside surface of the plate.

10. The dump body of claim 9, wherein the first doubler and the second doubler substantially overlap on respective sides of the plate.

11. The dump body of claim 8, wherein the respective pivot bore and the rib are substantially aligned.

12. The dump body of claim 8, further comprising:

another pivot assembly connected to the rib, wherein another stringer intersects the other pivot assembly.

13. The dump body of claim 8, wherein the rib extends on side walls of the dump body.

14. The dump body of claim 8, wherein the each gusset is connected to an exterior surface of the respective cover plate, wherein the each gusset is oriented such that the each gusset is angled toward a center of the respective pivot bore.

15. A machine, comprising:

a pivot assembly associated with a dump body of the machine, comprising:

a plurality of plates, wherein the plurality of plates is connected to a plurality of cover plates associated with a plurality of respective portions of a stringer that intersects the pivot assembly, wherein the plurality of plates is further connected to a rib that intersects the pivot assembly perpendicular to the stringer, wherein the plurality of cover plates is connected to the rib at a respective end of the plurality of cover plates;

a respective pivot bore in the plurality of plates;

a respective plurality of doublers around the respective pivot bore, wherein the respective plurality of doublers includes a first doubler located on an outside surface of a plate, of the plurality of plates, and a second doubler located on an inside surface of the plate, wherein the first doubler and the second doubler substantially overlap with each other on respective surfaces of the plate; and a plurality of gussets between the plurality of plates, wherein the plurality of gussets is connected to an exterior surface of a respective cover plate of the plurality of cover plates.

16. The machine of claim 15, wherein the plurality of gussets is connected to the second doubler, the plurality of plates, and the respective cover plate of the plurality of cover plates.

17. The machine of claim 15, wherein the respective pivot bore and the rib are substantially centered with respect to each other.

18. The machine of claim 15, wherein the plurality of cover plates includes a plurality of discontinuous structures.

19. The machine of claim 15, wherein the machine is an off-highway truck.

20. The machine of claim 15, wherein the dump body includes another pivot assembly that is connected to the rib.

* * * * *